(12) United States Patent
Duan et al.

(10) Patent No.: US 8,121,025 B2
(45) Date of Patent: Feb. 21, 2012

(54) METHOD AND SYSTEM FOR SWITCHING MULTICAST TRAFFIC AND ROUTER

(75) Inventors: Shaoxiong Duan, Shenzhen (CN); Xiaoniu Zhou, Shenzhen (CN); Haiyang Su, Shenzhen (CN); Feng Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 12/537,716

(22) Filed: Aug. 7, 2009

(65) Prior Publication Data

US 2009/0296709 A1  Dec. 3, 2009

Related U.S. Application Data (63) Continuation of application No. PCT/CN2008/071602, filed on Jul. 10, 2008.

(30) Foreign Application Priority Data

Oct. 22, 2007 (CN) .......................... 2007 1 0167324

(51) Int. Cl.
*H04L 12/26* (2006.01)
*H04L 12/28* (2006.01)
(52) U.S. Cl. .................. 370/218; 370/244; 370/401
(58) Field of Classification Search .................. None
See application file for complete search history.

(56) References Cited

U.S. PATENT DOCUMENTS

| 7,284,148 B2 | 10/2007 | Banerjee et al. |
| 7,447,225 B2 * | 11/2008 | Windisch et al. ............. 370/428 |
| 2003/0193958 A1 | 10/2003 | Narayanan |
| 2006/0018253 A1 * | 1/2006 | Windisch et al. ............. 370/216 |
| 2006/0018333 A1 * | 1/2006 | Windisch et al. ............. 370/432 |
| 2007/0239879 A1 * | 10/2007 | Serbest et al. ................ 709/230 |
| 2008/0130490 A1 | 6/2008 | Yu et al. |

FOREIGN PATENT DOCUMENTS

| CN | 1710881 A | 12/2005 |
| CN | 1838635 A | 9/2006 |
| CN | 101005394 A | 7/2007 |
| WO | 9851041 A1 | 11/1998 |
| WO | 2006014710 A2 | 2/2006 |

OTHER PUBLICATIONS

Written Opinion of the International Searching Authority (translation) dated (mailed) Oct. 23, 2008, issued in related Application No. PCT/CN2008/071602, filed Jul. 10, 2008, Huawei Technologies Co., Ltd.

European Patent Office Communication pursuant to Article 94(3) EPC, European search opinion for Application No. 08 773 156.8-2416, mailed Jan. 25, 2011, Huawei Technologies Co., Ltd.

Second Chinese Office Action dated (mailed) Aug. 12, 2011, in related Chinese Application No. 200710167324.4, Huawei Technologies Co., Ltd.

* cited by examiner

*Primary Examiner* — Hong Cho
(74) *Attorney, Agent, or Firm* — Finnegan, Henderson, Farabow, Garrett & Dunner LLP (57) ABSTRACT

A method for switching multicast traffic includes: entering, by a second router, a waiting state after receiving a packet indicative of recovery of a first router; and deleting, by the second router, the egress interface of MFIB entries on the second router after receiving a data packet or an Assert packet from the first router. A router and a system for switching multicast traffic are also provided herein.

7 Claims, 10 Drawing Sheets

METHOD AND SYSTEM FOR SWITCHING MULTICAST TRAFFIC AND ROUTER

CROSS-REFERENCE TO RELATED APPLICATIONS

This application is a continuation of International Application No. PCT/CN2008/071602, filed on Jul. 10, 2008, which claims the benefit of Chinese Patent Application No. 200710167324.4, filed on Oct. 22, 2007, both of which are hereby incorporated by reference in their entireties.

FIELD OF THE INVENTION

The present invention relates to the communication field, and in particular, to a method and system for switching multicast traffic, and a router.

BACKGROUND

The IP multicast means that a packet is sent to a specific node subset in a network in a best-effort mode, where the subset is called a multicast group. The basic principles of the IP multicast are:

A source host sends only one copy of data. The destination address in the data is a multicast group address; and all receivers in the multicast group can receive the same data copy, and the data is receivable by only the host in the multicast group, namely, the target host, rather than any other host in the network.

As regards the single-point-to-multipoint issue, the IP multicast technology provides an effective solution, implements efficient data transmission from a single point to multiple points in the IP network, saves the network bandwidth massively, and reduces the network load. As parallel to unicast and broadcast, multicast provides more important features. For example, the multicast feature of the network may be used to launch new Value-Added Services (VASs) conveniently, including the Internet information services such as live broadcast, IPTV, tele-education, telemedicine, network broadcasting station, and real-time videoconference.

Protocol Independent Multicast-Sparse Mode (PIM-SM) and Source-Specific Multicast (SSM) are two common intra-domain multicast modes. Under these two modes, the multicast packet is forwarded by creating a multicast distribution tree. However, in the case that multiple routers coexist in a shared network segment, the downstream router receives multiple duplicate copies of data if all the routers forward the data to this network segment. Therefore, one of the routers needs to be selected as a Designated Router (DR) in the network segment, and the DR is responsible for forwarding data to the network segment. If none of the interfaces of the routers connected to a user terminal enables the PIM SM or SSM, a router is selected as an interrogator via the Internet Group Management Protocol (IGMP) mechanism. The interrogator is responsible for forwarding data to this network segment.

Figure 1:
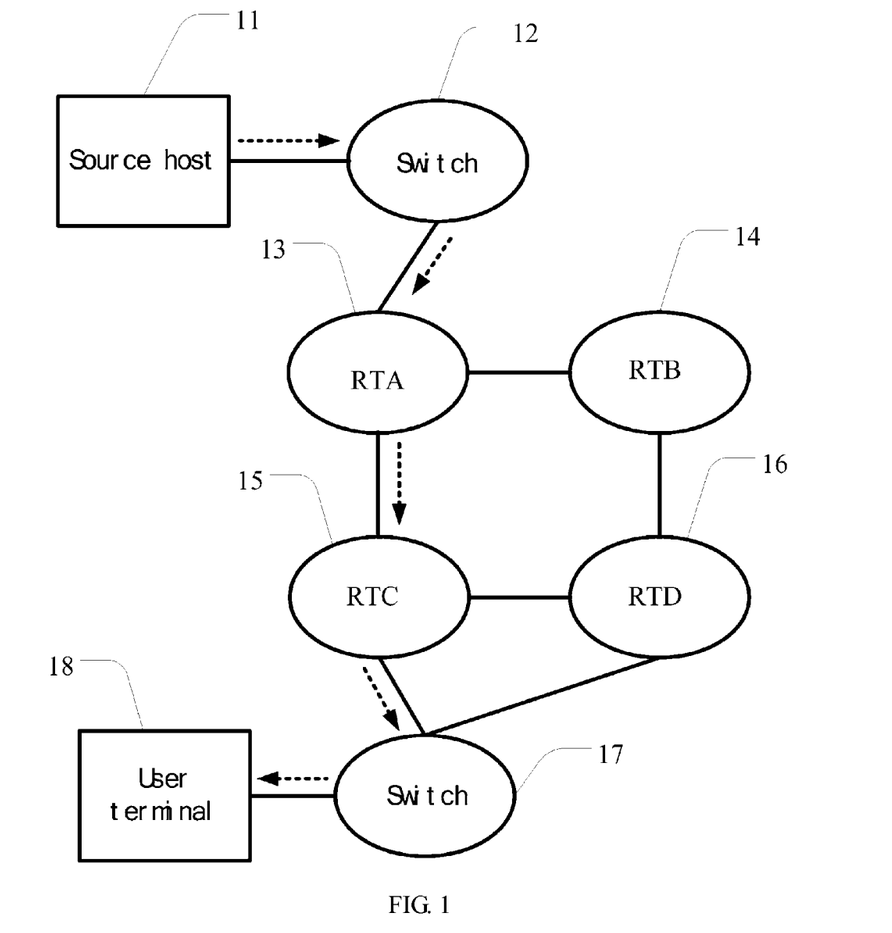
FIG. 1 shows normal data transmission in the network architecture in the prior art.

As shown in FIG. 1, the network includes: a user terminal 18, a source host 11, a switch 12, a switch 17, and four routers RTA 13, RTB 14, RTC 15, and RTD 16. The user terminal 18 is connected with RTC 15 and RTD 16 through the switch 17. Both RTC 15 and RTD 16 can receive the IGMP report sent by the user, and are involved in the DR selection. If the RTC 15 is selected as a DR or interrogator, the RTC 15 becomes a first router responsible for forwarding data. In this case, the RTD 16 serves as a second router, namely, a standby DR or interrogator, and does not forward data in normal circumstances. Likewise, if the RTD 16 is selected as a DR or interrogator, the RTD 16 becomes the first router and is responsible for forwarding data, and the RTC 15 serves as a second router, namely, standby DR or standby interrogator, and does not forward data in normal circumstances.

Figure 2:
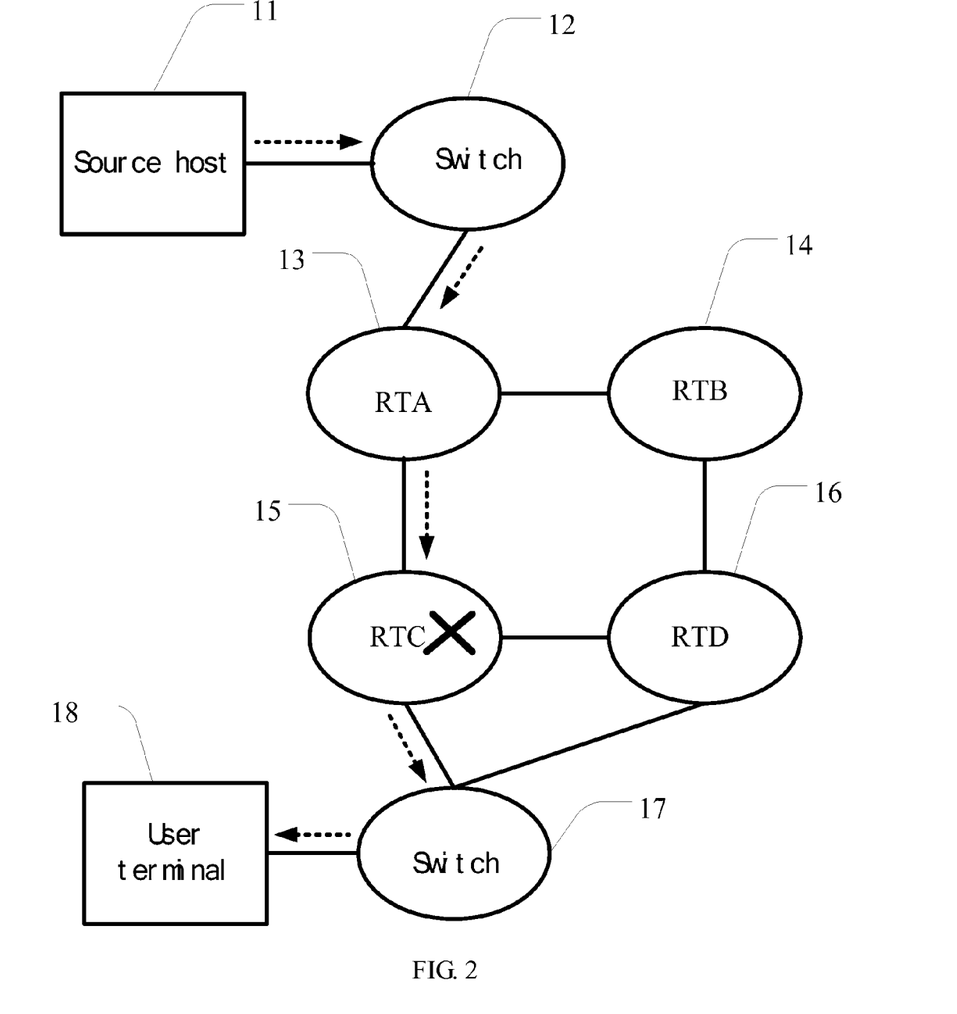
FIG. 2 shows transmission failure in the network architecture in the prior art.
Figure 3:
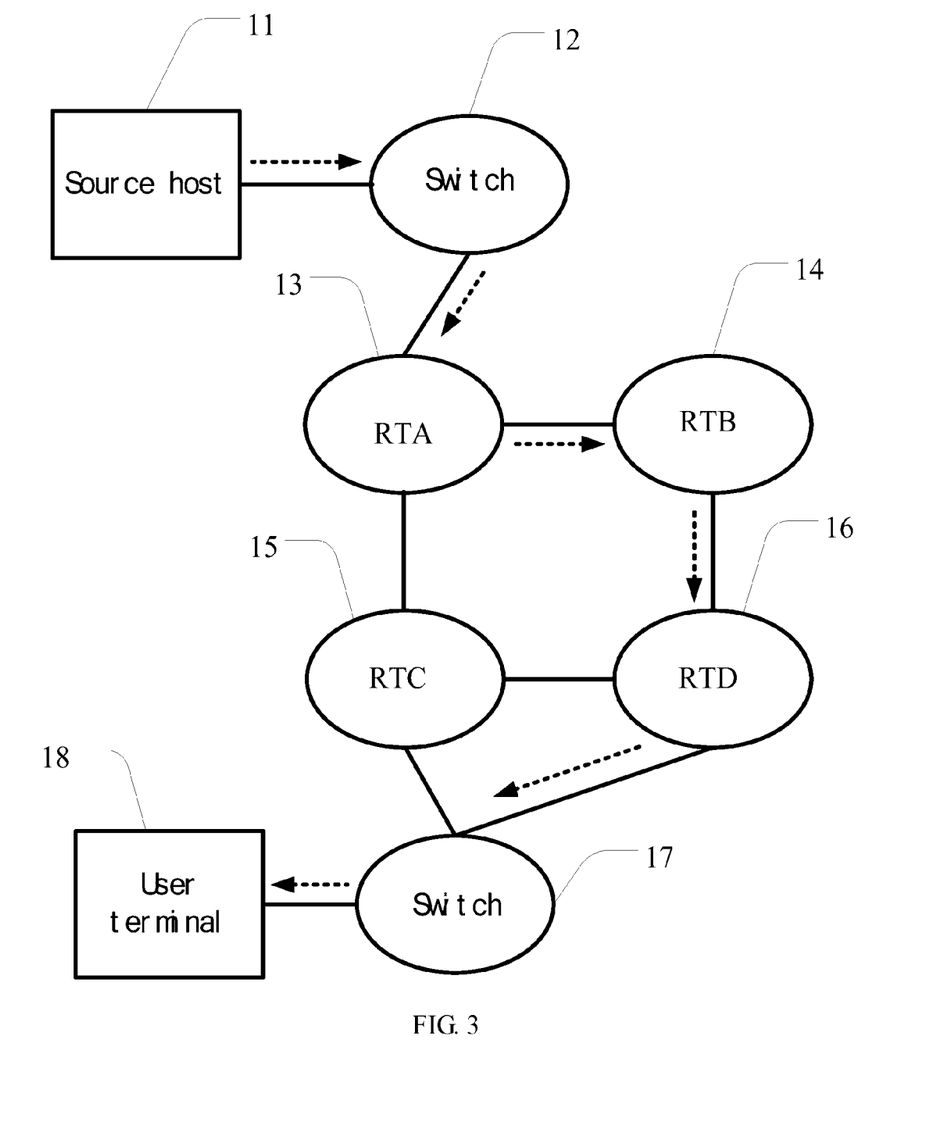
FIG. 3 shows data transmission when a fault occurs in the network architecture in the prior art.

As shown in FIG. 2, after the data forwarding begins, it is supposed that the DR or interrogator, namely, RTC 15 in FIG. 2, fails. The RTD 16 discovers the fault of the first router RTC 15 through a fast detection mechanism such as Bidirectional Forwarding Detection (BFD), and RTD 16 becomes a DR or interrogator and is responsible for forwarding data. In this case, the data sending mode is illustrated in FIG. 3. The arrowhead in FIG. 3 indicates the direction of sending the data along the standby path in the case of RTC 15 failure.

Figure 4:
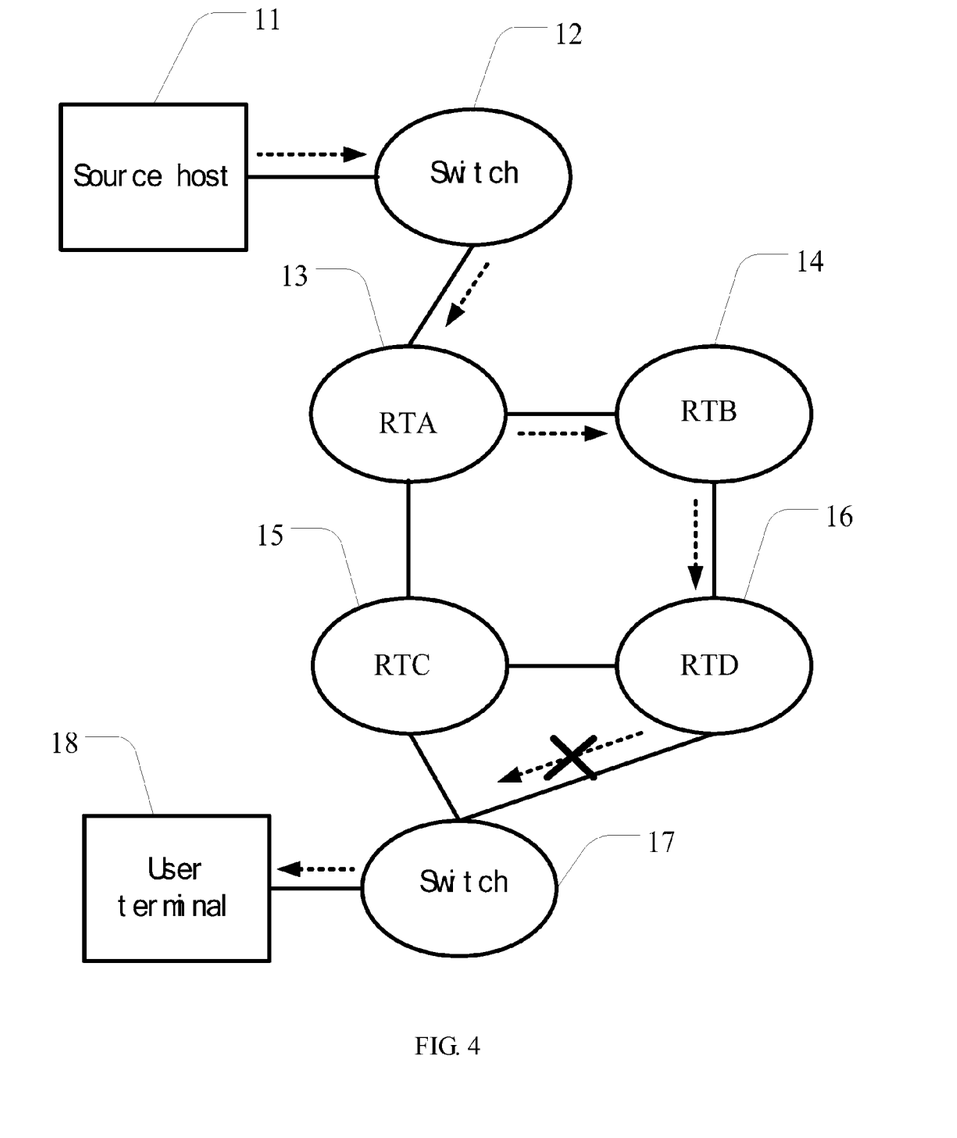
FIG. 4 shows transmission interruption in the case of switchback in the network architecture in the prior art.

As shown in FIG. 4, the RTC 15 recovers from failure. The RTD 16 receives a HELLO (handshake) packet or IGMP interrogation packet from the RTC 15, and becomes a non-DR or non-interrogator and stops forwarding data. However, the RTC 15 has not obtained the IGMP report message or the upstream router has not forwarded the data, and therefore, the RTC 15 does not forward the data. Consequently, once a fault occurs, the traffic is interrupted twice.

To tackle such problems, a sticky-dr (priority dr-priority) solution is put forwarded currently. In the solution, sticky-dr is configured through a command line interface. Once a router is selected as a DR, its priority is set to the configured value. In this way, it is not possible for the original active DR to be selected as a new DR after the original active DR is restarted. The selected new DR continues forwarding the data along a new path.

Therefore, in the foregoing scenario, the data is forwarded along this path: source host-switch-RTA-RTB-RTD-switch-user terminal after the fault is cleared. The forwarding direction is the same as the direction indicated by the arrowhead in FIG. 3.

The multicast service generally involves high traffic and occupies plenty of bandwidth. Therefore, in the network deployment, the operator generally plans the forwarding path, for example, RTA-RTC. For the purpose of disaster recovery, a standby path, for example, RTA-RTB-RTD, is reserved. In normal circumstances, the standby path, such as RTB or RTD, bears other services. Once the RTC fails, switch to the standby path for data transmission temporarily. After the fault is cleared, switch to the active path for data transmission, without occupying the standby path permanently. However, the sticky-dr solution is implemented by increasing priority. It is not possible for the original active DR to be selected successfully, and therefore, the standby path is occupied permanently.

SUMMARY

A method and system for switching multicast traffic and a router are provided in various embodiments of the present invention so that the data is switched back to the originally planned path after a fault is cleared.

The method and system for switching multicast traffic and the router provided herein are implemented through the following technical solution:

A method for switching multicast traffic includes:

entering, by a second router, a waiting state after receiving a packet indicative of recovery of a first router; and deleting an egress interface of Multicast Forwarding Information Base (MFIB) entries on the second router after receiving a data packet or an Assert packet from the first router.

A router is provided in an embodiment of the present invention. The router includes:

a first packet receiving unit, adapted to receive the packet that indicates recovery of the router connected to this unit;

a second packet receiving unit, adapted to receive the data packet or Assert packet from the router connected to this unit; and a first switchback unit, adapted to delete the egress interface of MFIB entries on the router after the second packet receiving unit receives the data packet or Assert packet.

A system for switching multicast traffic is provided in an embodiment of the present invention. The system includes:

a first router, adapted to send a recovery packet to the second router, and send a data packet or Assert packet to the second router; and a second router, adapted to receive the packet that indicates recovery of the first router, enter the waiting state after receiving the packet that indicates recovery of the first router, and delete the egress interface of MFIB entries on the second router after receiving the data packet or Assert packet from the first router.

In the technical solution under the present invention, after receiving the packet that indicates recovery of the first router, the second router enters the waiting state; after receiving the data packet or Assert packet from the first router, the second router disconnects the egress interface and the data is switched back to the first router. The data forwarding begins after the first router is connected, and then the second router is disconnected. Therefore, it is avoided that two routers interrupt the data forwarding concurrently, it is avoided that traffic is interrupted twice once a fault occurs, and the data can be switched back to the originally planned path without interruption after the fault is cleared.

DETAILED DESCRIPTION

A method and system for switching multicast traffic and a router are provided in an embodiment of the present invention. A standby router (namely, standby DR or standby interrogator, also known as the second router) enters the waiting state after receiving a PIM HELLO (handshake) packet or IGMP interrogation packet that indicates recovery of the active router (namely, active DR, also known as the first router). After receiving the data packet or Assert packet from the active router, the egress interface of the standby router is disconnected, and the data is switched back to the active router for further sending. Therefore, it is avoided that traffic is interrupted twice once a fault occurs, and the data can be switched back to the originally planned path for forwarding without interruption after the fault is cleared.

The embodiments of the present invention are detailed below by reference to the accompanying drawings.

The network architecture of the embodiments of the present invention is the same as that shown in FIG. 1. As shown in FIG. 1, the network architecture includes: a source host 11, a switch 12, a switch 17, four routers RTA 13, RTB 14, RTC 15, and RTD 16, and a user terminal 18. In practice, a device such as brancher may be used in place of the switch 12 and the switch 17. The user terminal 18 is connected with RTC 15 and RTD 16 through a port isolation apparatus (namely, switch 17). Both RTC 15 and RTD 16 can receive the IGMP report from the user terminal 18, and are involved in the DR selection. If the RTD 15 is selected as a DR or interrogator, the RTD 15 becomes the active router, namely, active DR, and is responsible for forwarding data, and the RTC 16 serves as a standby router, namely, standby DR or standby interrogator, and does not forward data in normal circumstances. The data transmission mode is shown in FIG. 1. The arrowhead in FIG. 1 indicates the direction of data transmission. After the RTC 15 fails, the RTD 16 discovers failure of the RTC 15 through a fast detection method such as BFD, and the RTD 16 performs DR or interrogator switching and is responsible for forwarding data. The data transmission is shown in FIG. 2. The arrowhead in FIG. 2 indicates the direction of data transmission in the case of RTC 15 failure. The objective of the prevent invention is: The data is switched back to the normal data transmission path of the active DR or interrogator, namely, RTC 15, without packet loss after the RTC 15 recovery. The data transmission path indicated by the arrowhead in FIG. 1 is the normal data transmission path. After the RTC 15 recovers from failure, the RTD 16 receives the HELLO packet or IGMP interrogation packet from the RTC 15, enters the waiting state, and continues to forward data to the network segment. Afterward, seamless switching is performed through data packets or protocol packets. The data transmission mode is recovered, as shown in FIG. 1. The method for switching multicast traffic under the present invention is described below in three scenarios.

Figure 5:
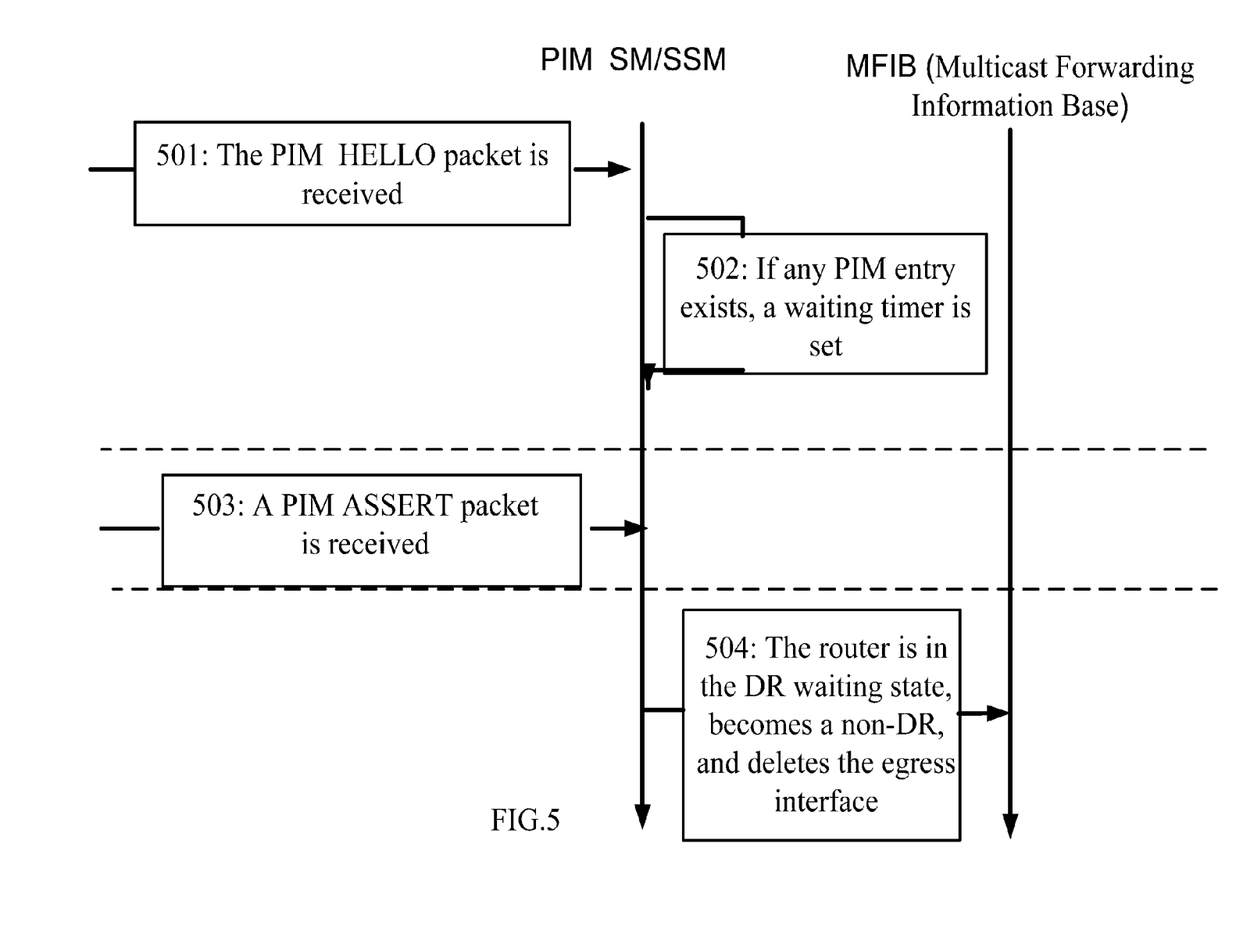
FIG. 5 is a flowchart of a method for switching multicast traffic in the first scenario provided in an embodiment of the present invention.

Scenario 1: The interface connected to the RTC and RTD of the user terminal enables PIM SM or SSM, and the RTD is in the DR waiting state; upon receiving an Assert packet of the RTC, the RTD performs DR processing and becomes a non-DR. The processing mode is shown in FIG. 5. As shown in FIG. 5 and FIG. 1, the processing mode, namely, the method for switching multicast traffic, in this scenario includes the following steps:

501: The standby DR 16 receives a PIM HELLO packet that indicates recovery of the active DR 15.

502: If any PIM entry, namely, multicast routing table entry, exists, a DR waiting timer is set, which is adapted to wait for the active DR 15 to forward the data packet or Assert packet. If the standby DR 16 fails to receive the data packet or Assert packet forwarded by the active DR 15 within a time length set by the timer, switch forcibly to the active DR for data transmission.

503: The standby DR 16 receives the Assert packet from the active DR 15.

504: The standby DR 16 is in the DR waiting state. It becomes a non-DR, and deletes the egress interface of its MFIB entries. switch back to the active DR 15 for data transmission.

Figure 6:
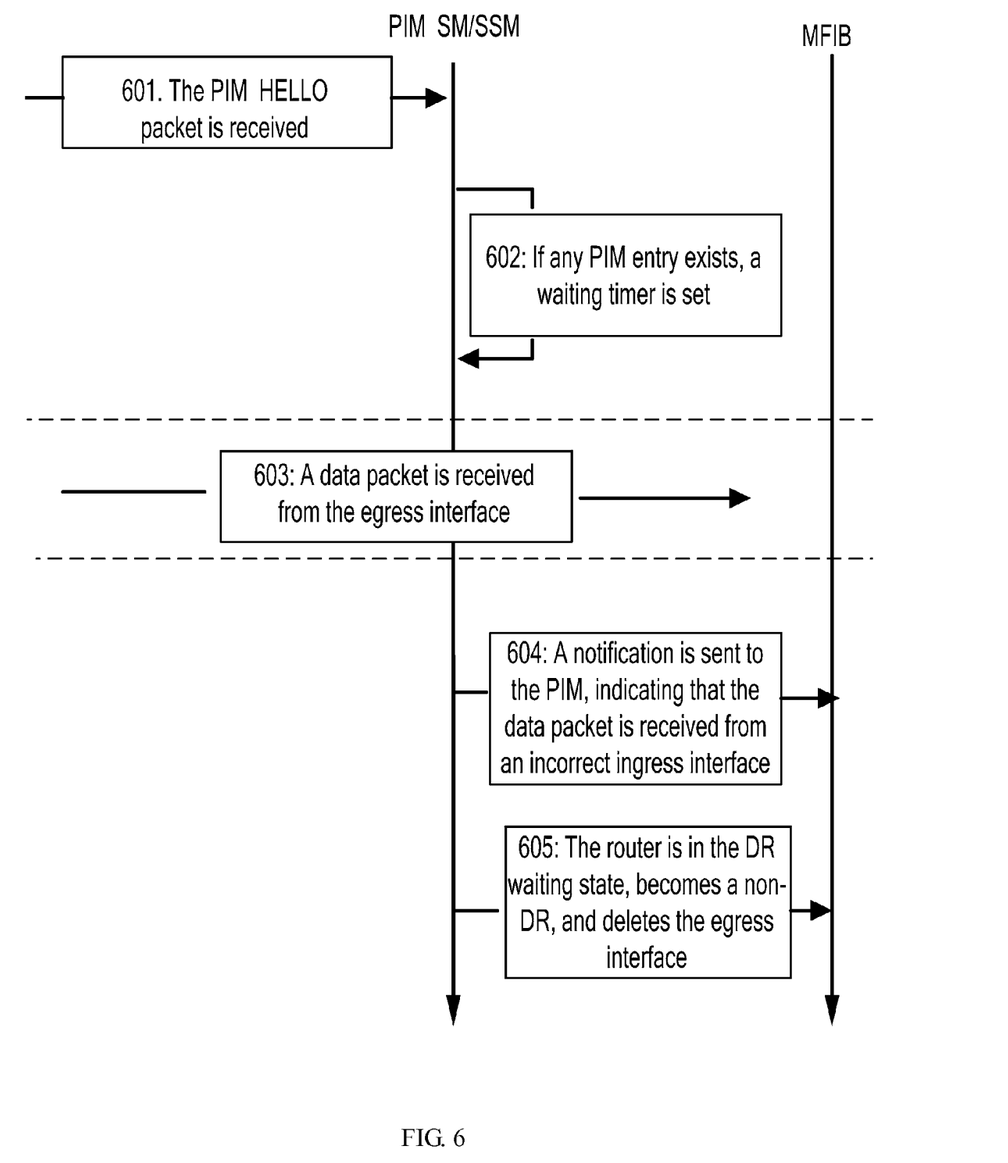
FIG. 6 is a flowchart of a method for switching multicast traffic in the second scenario provided in an embodiment of the present invention.

Scenario 2: The interface connected to the RTC and RTD of the user terminal enables PIM SM or SSM, and the RTD is in the DR waiting state; upon receiving a data packet of the RTC, the RTD performs DR processing if the RTD is in the DR waiting state, and becomes a non-DR. The processing mode is shown in FIG. 6. As shown in FIG. 6 and FIG. 1, the processing mode, namely, the method for switching multicast traffic, in this scenario includes the following steps:

601: The standby DR 16 receives a PIM HELLO packet that indicates recovery of the active DR 15.

602: If any PIM entry, namely, multicast routing table entry, exists, a DR waiting timer is set, which is adapted to wait for the active DR 15 to forward the data packet or Assert packet. If the standby DR 16 fails to receive the data packet or Assert packet forwarded by the active DR within a time length set by the timer, switch forcibly to the active DR for data transmission.

603: The standby DR 16 receives the data packet from the active DR 15 through its egress interface.

604: A notification is sent to the PIM, indicating that the data packet is received from an incorrect interface.

605: The standby DR 16 is in the DR waiting state. It becomes a non-DR, and deletes the egress interface of its MFIB entries. Switch back to the active DR 15 for data transmission.

Figure 7:
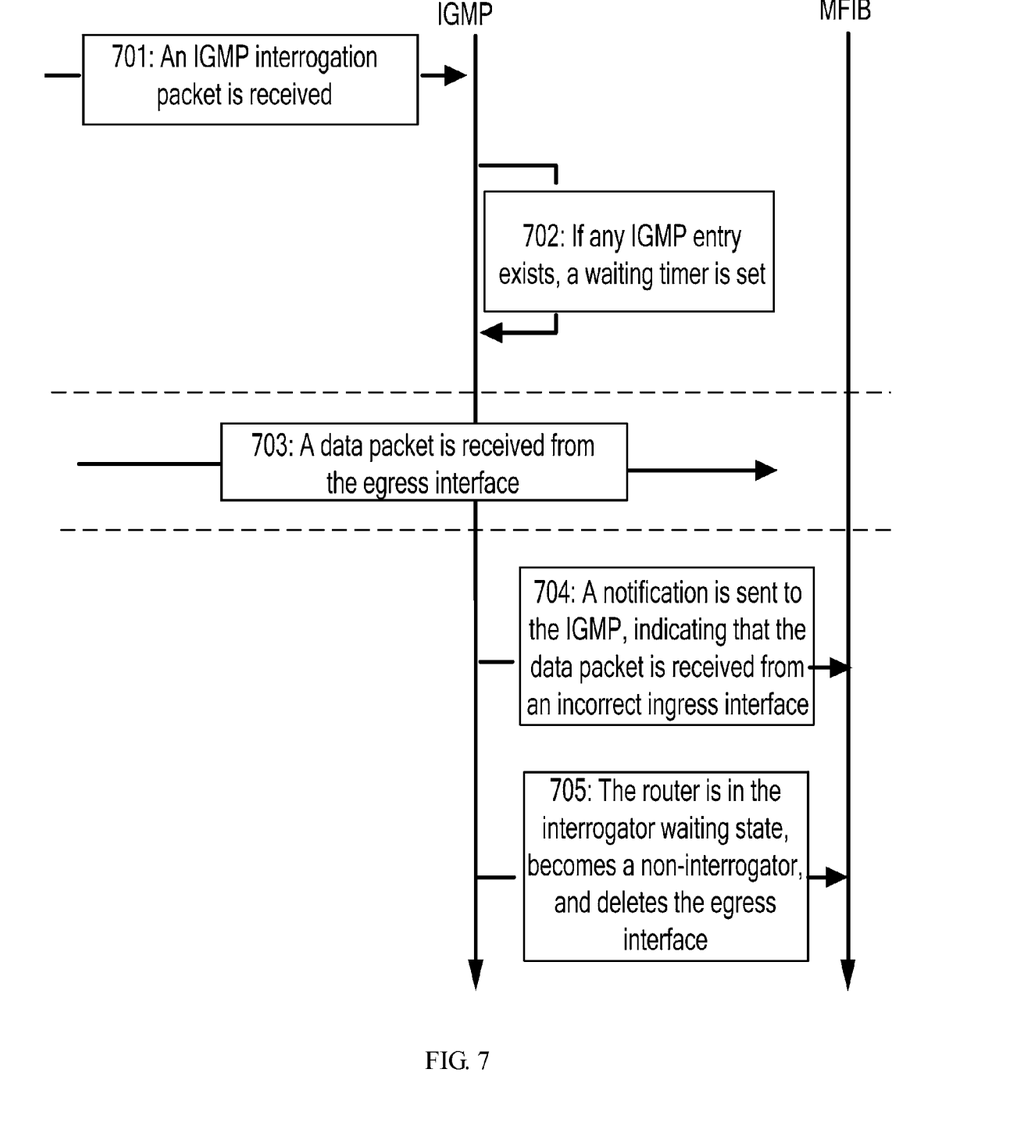
FIG. 7 is a flowchart of a method for switching multicast traffic in the third scenario provided in an embodiment of the present invention.

Scenario 3: The interface connected to the RTC and RTD of the user terminal does not enable PIM SM or SSM, but enables the IGMP only. The RTD is in the interrogator waiting state. Upon receiving a data packet of the RTC, the RTD performs interrogator processing if the RTD is in the interrogator waiting state, and becomes a non-interrogator. The processing mode is shown in FIG. 7. As shown in FIG. 7 and FIG. 1, the processing mode, namely, the method for switching multicast traffic, in this scenario includes the following steps:

701: The standby interrogator 16 receives an IGMP interrogation packet that indicates recovery of the active interrogator 15.

702: If any IGMP entry, namely, multicast routing table entry, exists, an interrogator waiting timer is set, which is adapted to wait for the active interrogator 15 to forward the data packet. If the standby interrogator 16 fails to receive the data packet forwarded by the active interrogator 15 within a time length set by the timer, the data is switched forcibly to the active router 15 for further forwarding.

703: The standby interrogator 16 receives the data packet from the active interrogator 15 through its egress interface.

704: A notification is sent to the IGMP, indicating that the data packet is received from an incorrect interface.

705: The standby interrogator 16 is in the interrogator waiting state. It becomes a non-interrogator, and deletes the egress interface of its MFIB entries. Switch back to the active interrogator 15 for data transmission.

The embodiments of the method for switching multicast traffic in the foregoing three scenarios are detailed below.

Embodiment 1

The PIM SM DR switches back without packet loss. As shown in FIG. 1.

The interface connected to the RTC 15 and the RTD 16 of the user terminal enables the PIM SM. The user terminal joins a group G1 through an Internet Group Management Protocol V2 (IGMP V2) to receive the data sent to this group. The RTC 15 is selected as a DR, and is responsible for forwarding data.

After the RTC 15 fails, the RTD 16 discovers failure of the RTC 15 through a fast detection method such as BFD. The RTD 16 is selected as a DR and is responsible for forwarding data.

After the RTC 15 recovers, the RTD 16 enters the DR waiting state. Upon receiving the data packet or Assert packet from the RTC 15, the RTD 16 deletes the egress interface of MFIB entries on the RTD 16, and the RTC 15 forwards data.

Embodiment 2

The PIM SM DR switches back without packet loss. As shown in FIG. 1, the details are as follows.

The interface connected to the RTC 15 and the RTD 16 of the user terminal enables the PIM SSM. Through IGMP V3, the user terminal receives the data sent by the multicast source S1 to a group G1. The RTC 15 is selected as a DR, and is responsible for forwarding data.

After the RTC 15 fails, the RTD 16 is selected as a DR, and is responsible for forwarding data.

After the RTC 15 recovers, the RTD 16 enters the DR waiting state. Upon receiving the data packet or Assert packet from the RTC 15, the RTD 16 deletes the egress interface of MFIB entries on the RTD 16, and the RTC 15 forwards data.

Embodiment 3

The IGMP interrogator switches back without packet loss. As shown in FIG. 1, the details are as follows.

The interface connected to the RTC 15 and the RTD 16 of the user terminal does not enable the PIM SM or SSM, but enables IGMP only. Through the IGMP, the user terminal joins a group G1 to receive the data sent to this group. The RTC 15 is selected as an interrogator, and is responsible for forwarding data.

After the RTC 15 fails, the RTD 16 discovers failure of the RTC 15 through a fast detection method such as BFD. The RTD 16 is selected as an interrogator and is responsible for forwarding data.

After the RTC 15 recovers, the RTD 16 enters the interrogator waiting state. Upon receiving the data packet from the RTC 15, the RTD 16 deletes the egress interface of MFIB entries on the RTD 16, and the RTC 15 forwards data.

Figure 8:
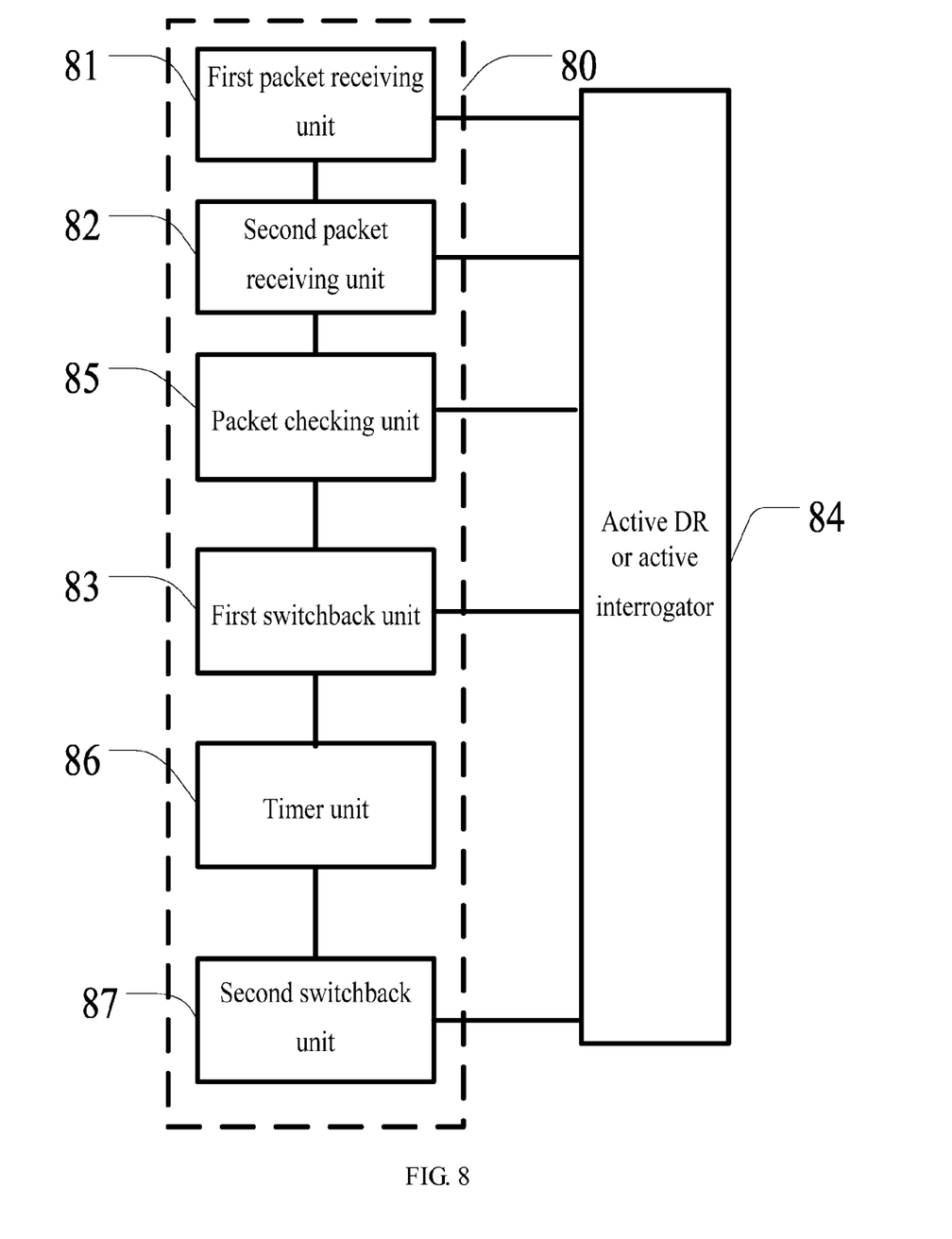
FIG. 8 shows a structure of a router provided in an embodiment of the present invention.

A router 80 is provided in an embodiment of the present invention. As shown in FIG. 8, the router 80 includes:

a first packet receiving unit 81, adapted to receive a PIM HELLO packet indicative of recovery of the active router 84 when the interface connected to the router of the user terminal enables only the PIM SM or SSM, or receive an IGMP interrogation packet indicative of recovery of the active router 84 when the interface connected to the router of the user terminal enables only the IGMP;

a second packet receiving unit 82, adapted to receive a data packet or Assert packet of the active router 84 when the interface connected to the router of the user terminal enables only the PIM SM or SSM, or receive a data packet of the active router 84 when the interface connected to the router of the user terminal enables only the IGMP; and a first switchback unit 83, adapted to delete the egress interface of MFIB entries on the router 80 after receiving the data packet or Assert packet.

The router 80 may further include a packet checking unit 85, adapted to check whether a data packet of the active router 84 is received from an ingress interface of the router 80 when the second packet receiving unit 82 receives the data packet;

if the data packet is not received from the ingress interface, notify the PIM that the data packet is received from an incorrect interface; or, check whether a data packet of the active router 84 is received from an ingress interface of the router 80 when the second packet receiving unit 82 receives the data packet: if the data packet is not received from the ingress interface, notify the IGMP that the data packet is received from an incorrect interface.

Further, the router 80 may further include:

a timer unit 86, which is started after the router 80 enters the waiting state, and waits for the active router 84 connected with the timer unit to send a data packet or Assert packet; and a second switchback unit 87, adapted to delete the egress interface of MFIB entries on the router 80 if the router 80 fails to receive the data packet or Assert packet from the active router 84 connected with the second switchback unit within the time length set by the timer unit 86.

The router 80 applied to the multicast traffic switching is detailed below. As regards the network architecture of the following embodiment, FIG. 1 is referred to.

Embodiment 1

When the interface connected to the RTC 15 and the RTD 16 of the user terminal enables the PIM SM, the user terminal joins a group G1 through the IGMP V2 to receive the data sent to this group. The RTC 15 is selected as a DR, which is the active DR 84 illustrated in FIG. 8 and is responsible for forwarding data. The RTD 16 is the router 80, namely, standby DR 80, illustrated in FIG. 8, and includes a first packet receiving unit 81, a second packet receiving unit 82, and a switchback unit 83. After the RTC 15 fails, the RTD 16 as a standby DR discovers the failure of the RTC 15 through a fast detection method such as BFD. At this time, the RTD 16 is selected as a DR and is responsible for forwarding data. After the RTC 15 recovers, the first packet receiving unit 81 of the RTD 16, namely, router 80, receives the PIM HELLO packet indicative of recovery of the active DR 84, and the RTD 16 as a standby DR enters the DR waiting state. After the second packet receiving unit 82 receives the data packet or Assert packet of the active DR 84, the first switchback unit 83 deletes the egress interface of MFIB entries on the standby DR 80, and switches the data back to the active DR 84 for further sending.

Embodiment 2

When the interface connected to the RTC 15 and the RTD 16 of the user terminal enables the PIM SSM, the user terminal receives the data sent by the multicast source S1 to a group G1 through the IGMP V3. The RTC 15 is selected as a DR, which is the active DR 84 illustrated in FIG. 8 and is responsible for forwarding data. The RTD 16 is the router 80, namely, standby DR 80, illustrated in FIG. 8, and includes a first packet receiving unit 81, a second packet receiving unit 82, and a switchback unit 83. After the RTC 15 fails, the RTD 16 as a standby DR discovers the failure of the RTC 15 through a fast detection method such as BFD. At this time, the RTD 16 is selected as a DR and is responsible for forwarding data. After the RTC 15 recovers, the first packet receiving unit 81 of the RTD 16, namely, router 80, receives the PIM HELLO packet indicative of recovery of the active DR 84, and the standby DR enters the DR waiting state. After the second packet receiving unit 82 receives the data packet or Assert packet of the active DR 84, the first switchback unit 83 deletes the egress interface of MFIB entries on the standby DR 80, and switches the data back to the active DR 84 for further sending.

Embodiment 3

When the interface connected to the RTC 15 and the RTD 16 of the user terminal does not enable the PIM SM or SSM but enables the IGMP only, the user terminal joins a group G1 through the IGMP to receive the data sent to this group. The RTC 15 is selected as an interrogator, which is the active router 84 illustrated in FIG. 8 and is responsible for forwarding data. The RTD 16 is the router 80, namely, standby interrogator 80, illustrated in FIG. 8, and includes a first packet receiving unit 81, a second packet receiving unit 82, and a switchback unit 83. After the RTC 15 fails, the RTD 16 discovers failure of the RTC 15 through a fast detection method such as BFD. At this time, the RTD 16 is selected as an interrogator, which is a standby interrogator and is responsible for forwarding data. After the RTC 15 recovers, after the first packet receiving unit 81 of the standby interrogator receives the PIM HELLO packet indicative of recovery of the active router 84, the RTD 16 as a standby interrogator enters the interrogator waiting state. After the second packet receiving unit 82 receives the data packet of the active router 84 (RTC 15), the first switchback unit 83 deletes the egress interface of MFIB entries on the standby interrogator 80, and switches the data back to the active router 84 for further sending.

Figure 9:
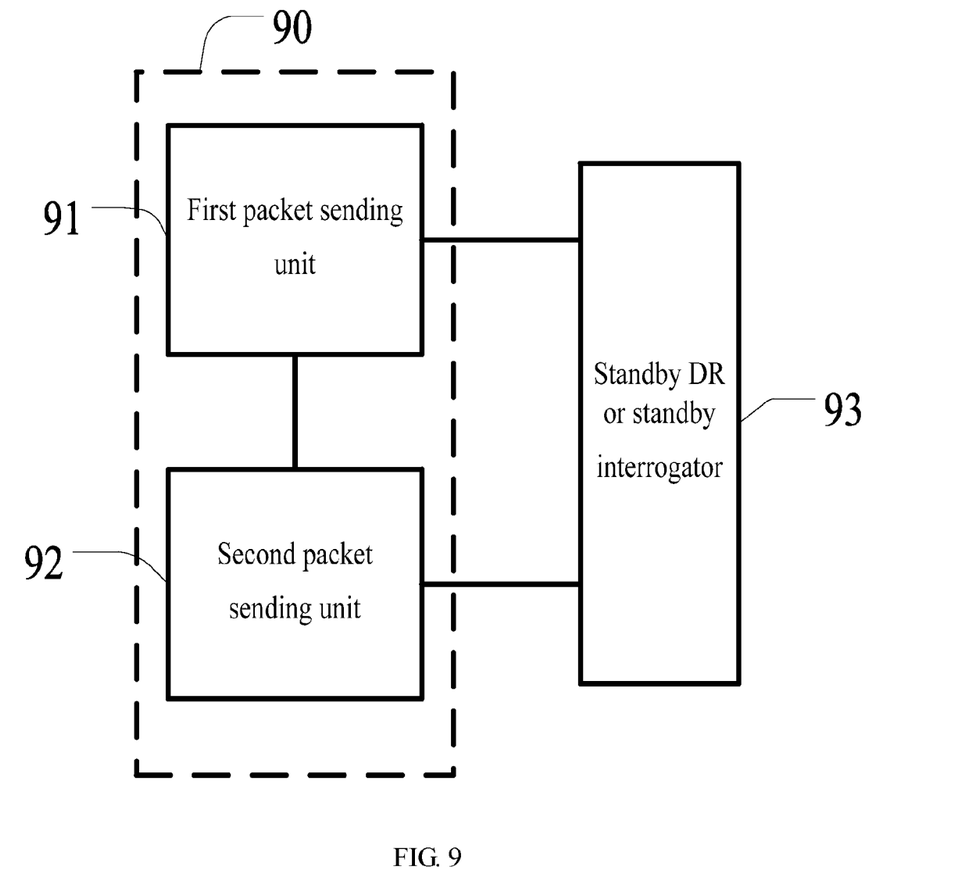
FIG. 9 shows a structure of another router provided in an embodiment of the present invention.

A router 90 is provided in an embodiment of the present invention. As shown in FIG. 9, the router 90 includes:

a first packet sending unit 91, adapted to send a PIM HELLO packet indicative of recovery to the standby router 93 when the interface connected to the router of the user terminal enables only the PIM SM or SSM, or send an IGMP interrogation packet indicative of recovery to the standby router 93 when the interface connected to the router of the user terminal enables only the IGMP; and a second packet sending unit 92, adapted to send a data packet or Assert packet to the standby router 93 when the interface connected to the router of the user terminal enables only the PIM SM or SSM, or send a data packet to the standby router 93 when the interface connected to the router of the user terminal enables only the IGMP.

The router 90 applied to the multicast traffic switching is detailed below. As regards the network architecture of the following embodiment, FIG. 1 and FIG. 9 are referred to.

Embodiment 1

When the interface connected to the RTC 15 and the RTD 16 of the user terminal enables the PIM SM, the user terminal joins a group G1 through the IGMP V2 to receive the data sent to this group. The RTC 15 is selected as a DR, which is the active DR 90 illustrated in FIG. 9 and is responsible for forwarding data. After the RTC 15 fails, the RTD 16 as a standby DR discovers the failure of the RTC 15 through a fast detection method such as BFD. The RTD 16 is selected as a DR, which is the standby DR 93, namely, standby router 93, illustrated in FIG. 9 and is responsible for forwarding data. The active DR 90 serves as the router 90, which includes a first packet sending unit 91 and a second packet sending unit 92. The first packet sending unit 91 sends a PIM HELLO interrogation packet indicative of recovery to the standby DR 93, and the RTD 16 as a standby DR 93 enters the DR waiting state. The second packet sending unit 92 sends a data packet or Assert packet to the standby DR 93, and the standby DR 93 deletes the egress interface of MFIB entries, and switches the data back to the active DR 90 for further sending.

Embodiment 2

When the interface connected to the RTC 15 and the RTD 16 of the user terminal enables the PIM SSM, the user terminal receives the data sent by the multicast source S1 to a group G1 through the IGMP V3. The RTC 15 is selected as a DR, which is the active DR 90 illustrated in FIG. 9 and is responsible for forwarding data. After the RTC fails, the RTD 16 as a standby DR discovers the failure of the RTC 15 through a fast detection method such as BFD. The RTD 16 is selected as a DR, which is the standby DR 93, namely, standby router 93, illustrated in FIG. 9 and is responsible for forwarding data. The active DR 90 serves as the router 90, which includes a first packet sending unit 91 and a second packet sending unit 92. The first packet sending unit 91 sends a PIM HELLO packet indicative of recovery to the standby DR 93, and the RTD 16 as a standby DR 93 enters the DR waiting state. The second packet sending unit 92 sends a data packet or Assert packet to the standby DR 93, and the standby DR 93 deletes the egress interface of MFIB entries, and switches the data back to the active DR 90 for further sending.

Embodiment 3

The interface connected to the RTC 15 and the RTD 16 of the user terminal does not enable the PIM SM or SSM, but enables IGMP only. Through the IGMP, the user terminal joins a group G1 to receive the data sent to this group. The RTC 15 is selected as an interrogator, which is the active router 90 illustrated in FIG. 9 and is responsible for forwarding data. After the RTC 15 fails, the RTD 16 discovers the failure of the RTC 15 through a fast detection method such as BFD. The RTD 16 is selected as an interrogator, which is the standby interrogator 93, namely, standby router 93, illustrated in FIG. 9 and is responsible for forwarding data. After the RTC 15 recovers, the active DR 90 serves as the active router 90, which includes a first packet sending unit 91 and a second packet sending unit 92. The first packet sending unit 91 of the active router 90 sends an IGMP interrogation packet indicative of recovery to the standby interrogator 93, and the RTD 16 as a standby interrogator 93 enters the interrogator waiting state. The second packet sending unit 92 sends a data packet to the standby interrogator 93, and the standby interrogator 93 deletes the egress interface of MFIB entries, and switches the data back to the active interrogator 90 for further sending.

Figure 10:
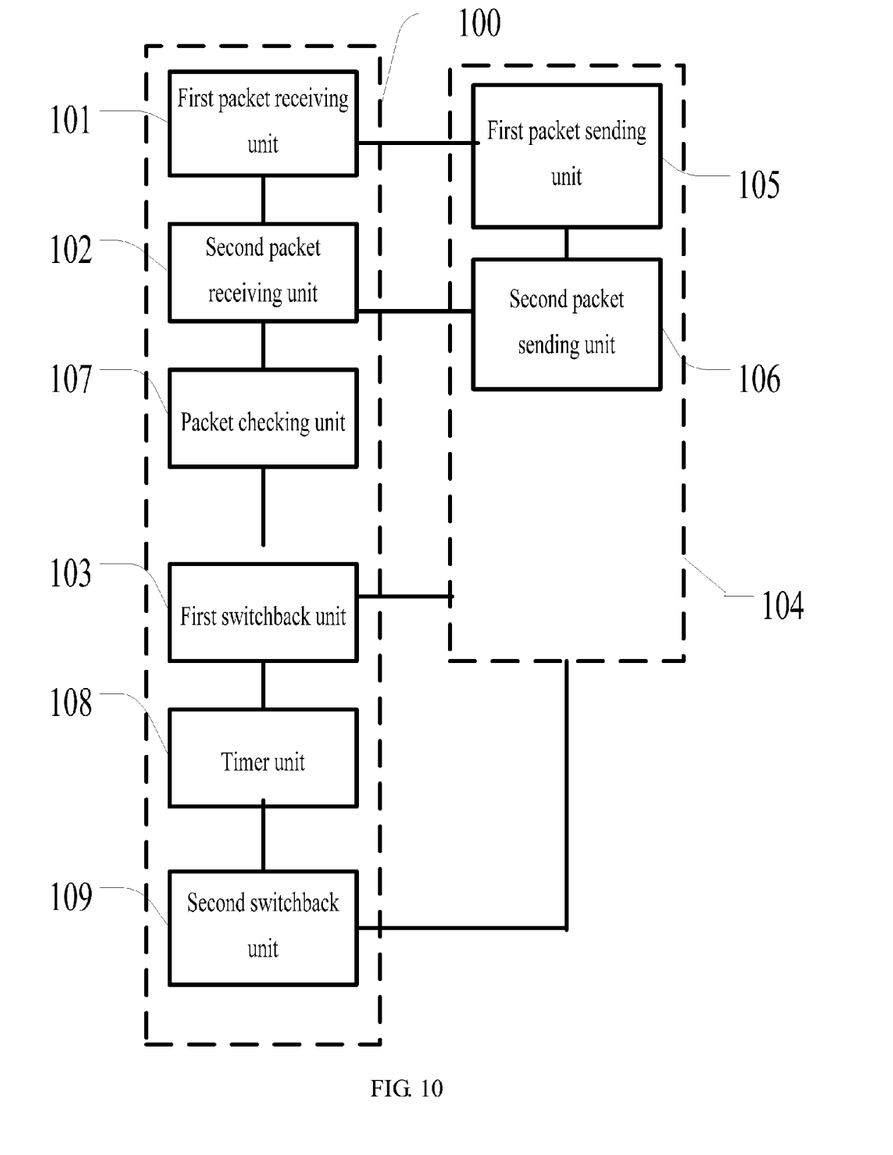
FIG. 10 shows a structure of a system for switching multicast traffic in an embodiment of the present invention.

A system for switching multicast traffic is provided in an embodiment of the present invention. As shown in FIG. 10, the system includes a standby router 100, namely, standby DR or standby interrogator 100, and an active router 104, namely, active DR or active router 104.

The standby router 100 includes:
a first packet receiving unit 101, adapted to receive a PIM HELLO packet indicative of recovery from the first packet sending unit 105 of the active router 104 when the interface connected to the router of the user terminal enables only the PIM SM or SSM, or receive an IGMP interrogation packet indicative of recovery from the first packet sending unit 105 of the active router 104 when the interface connected to the router of the user terminal enables only the IGMP;
a second packet receiving unit 102, adapted to receive a data packet or Assert packet from the second packet sending unit 106 of the active router 104 when the interface connected to the router of the user terminal enables only the PIM SM or SSM, or receive a data packet from the second packet sending unit 106 of the active router 104 when the interface connected to the router of the user terminal enables only the IGMP; and
a first switchback unit 103, adapted to delete the egress interface of MFIB entries on the standby router 100 after receiving the data packet or Assert packet.

The active router 104 includes:
a first packet sending unit 105, adapted to send a PIM HELLO packet indicative of recovery to the first packet receiving unit 101 of the standby router 100 when the interface connected to the router of the user terminal enables only the PIM SM or SSM, or send an IGMP interrogation packet indicative of recovery to the first packet receiving unit 101 of the standby router 100 when the interface connected to the router of the user terminal enables only the IGMP; and
a second packet sending unit 106, adapted to send a data packet or Assert packet to the second packet receiving unit 102 of the standby router 100 when the interface connected to the router of the user terminal enables only the PIM SM or SSM, or send a data packet to the second packet receiving unit 102 of the standby router 100 when the interface connected to the router of the user terminal enables only the IGMP.

The standby router 100 may further include a packet checking unit 107, adapted to check whether a data packet or Assert packet is received from an ingress interface when the interface connected to the router of the user terminal enables the PIM SM or SSM and the second packet receiving unit 102 receives the data packet or Assert packet from the second packet sending unit 106: if the data packet or Assert packet is not received from the ingress interface, notify the PIM that the data packet or Assert packet is received from an incorrect interface.

In order to better fulfill the objectives of the present invention, the standby router 100 may further include:
a timer unit 108, which is started after the router 100 enters the waiting state, and waits for the second packet sending unit 106 of the active router 104 to send a data packet or Assert packet; and
a second switchback unit 109, adapted to delete the egress interface of MFIB entries on the router 100 if the second packet receiving unit 102 of the router 100 fails to receive the data packet or Assert packet from the second packet sending unit 106 of the active router 104 within a time length set by the timer unit 108.

Through the method and the system for switching multicast traffic in the foregoing embodiments, the multicast traffic is switched from the standby path to the active path without interruption after the active router fails in the PIM SM or SSM and IGMP, and the standby path is not occupied permanently.

Detailed above are a method and a system for switching multicast traffic as well as a router in an embodiment of the present invention. Although the invention is described through some exemplary embodiments, the invention is not limited to such embodiments. It is apparent that those skilled in the art can make various modifications and variations to the invention without departing from the scope of the invention.

What is claimed is:
1. A method for switching multicast traffic, comprising:
   entering, by a second router, a waiting state after receiving a packet indicative of recovery of a first router;
   deleting an egress interface of Multicast Forwarding Information Base, MFIB, entries on the second router after receiving a data packet or an Assert packet from the first router; and
   checking, by the second router, whether the data packet or the Assert packet is received from an ingress interface when an interface connected to a router of a user termi- nal enables a Protocol Independent Multicast, PIM, and the second router receives the data packet or the Assert packet of the first router:
  if the data packet or the Assert packet is not received from the ingress interface, notifying the PIM, that the data packet or the Assert packet is received from an incorrect interface; or
checking whether the data packet is received from the ingress interface when the interface connected to the router of the user terminal enables an Internet Group Management Protocol, IGMP and the second router receives the data packet of the first router:
  if the data packet is not received from the ingress interface, notifying the IGMP that the data packet is received from the incorrect interface.

2. The method for switching multicast traffic according to claim 1, wherein the process of receiving the packet indicative of recovery of the first router comprises:
  receiving, by the second router, a handshake packet indicative of the recovery of the first router; or
  receiving an IGMP interrogation packet indicative of the recovery of the first router.

3. The method for switching multicast traffic according to claim 1, further comprising:
  starting, by the second router, a waiting timer of multicast routing table entries on the second router after entering the waiting state, and waiting for the first router to forward the data packet or the Assert packet; and
  deleting the egress interface of the MFIB entries on the second router if the second router fails to receive the data packet or the Assert packet forwarded by the first router within a time length set by the timer.

4. A router, comprising:
  a first packet receiving unit, adapted to receive a packet that indicates recovery of a router connected to this unit;
  a second packet receiving unit, adapted to receive a data packet or an Assert packet from the router connected to this unit;
  a first switchback unit, adapted to delete an egress interface of Multicast Forwarding Information Base, MFIB, entries on the router after the second packet receiving unit receives the data packet or Assert packet; and
  a packet checking unit adapted to:
  check whether the data packet or the Assert packet is received from an ingress interface of the router when an interface connected to a router of a user terminal enables a Protocol Independent Multicast, PIM, and the second packet receiving unit receives the data packet or the Assert packet from the router connected to this unit:
    if the data packet or Assert packet is not received from the ingress interface, notify the PIM, that the data packet or the Assert packet is received from an incorrect interface; or
  check whether the data packet is received from the ingress interface of the router when the interface connected to the router of the user terminal enables an Internet Group Management Protocol, IGMP and the second packet receiving unit receives the data packet of the router connected to this unit:
    if the data packet is not received from the ingress interface, notify the IGMP that the data packet is received from the incorrect interface.

5. The router of claim 4, further comprising:
  a timer unit, which is started after the router enters a waiting state, and waits for a router connected with the timer unit to send the data packet or the Assert packet; and
  a second switchback unit, adapted to delete the egress interface of the MFIB entries on the router if the router fails to receive the data packet or the Assert packet from the router connected with the second switchback unit within a time length set by the timer unit.

6. A system for switching multicast traffic, comprising:
  a first router, adapted to send a recovery packet to a second router, and send a data packet or Assert packet to a second router;
  the second router, adapted to receive a packet that indicates recovery of the first router, enter a waiting state after receiving the packet that indicates the recovery of the first router, and delete an egress interface of Multicast Forwarding Information Base, MFIB, entries on the second router after receiving the data packet or the Assert packet from the first router; and
  the second router checks whether the data packet or the Assert packet is received from an ingress interface; and determines that the data packet or the Assert packet is received from an incorrect interface if the data packet or the Assert packet is not received from the ingress interface.

7. The system for switching multicast traffic according to claim 6, wherein:
  the second router is further adapted to delete the egress interface of the MFIB entries on the second router if the second router fails to receive the data packet or the Assert packet within a preset time length after entering the waiting state.

* * * * *